United States Patent [19]

Curtis, Jr. et al.

[11] 3,929,738

[45] Dec. 30, 1975

[54] PRODUCTION OF LOW MOLECULAR WEIGHT POLYANHYDRIDE COMPOUNDS

[75] Inventors: Omer E. Curtis, Jr., Morristown; Harold W. Tuller, Long Valley; Charles T. O'Neill, Dover; Ralph W. Nussbaum, West Orange, all of N.J.

[73] Assignee: Allied Chemical Corporation, New York, N.Y.

[22] Filed: Mar. 26, 1973

[21] Appl. No.: 345,172

Related U.S. Application Data

[62] Division of Ser. No. 81,616, Oct. 16, 1970, Pat. No. 3,732,332.

[52] U.S. Cl. ........................ 260/78.5 R; 260/78.5 T
[51] Int. Cl.² .................... C08F 2/02; C08F 222/08
[58] Field of Search ...................... 260/78.5 R

[56] References Cited
UNITED STATES PATENTS

| | | | |
|---|---|---|---|
| 2,537,020 | 1/1951 | Barrett | 260/78.5 |
| 2,864,808 | 12/1958 | Harris | 260/78.5 |
| 2,971,939 | 2/1961 | Baer | 260/45.5 |
| 3,380,972 | 4/1968 | Le Blanc | 260/78.5 R |
| 3,558,570 | 1/1971 | Rinno et al. | 260/78.5 |
| 3,755,264 | 8/1973 | Testa | 260/78.5 R |

*Primary Examiner*—John Kight, III
*Attorney, Agent, or Firm*—Michael S. Jarosz

[57] ABSTRACT

Polyanhydrides are produced by a novel bulk polymerization procedure from maleic monomers and alkyl styrenes. The polyanhydrides, of low molecular weight and containing maleic monomer to alkyl styrene in a ratio greater than 1 to 1, are particularly useful as hardeners for epoxy resin-containing compositions and give rise to epoxy compositions which result in cured products exhibiting high heat distortion temperatures and excellent electrical and shelf life properties.

18 Claims, No Drawings

PRODUCTION OF LOW MOLECULAR WEIGHT POLYANHYDRIDE COMPOUNDS

This is a division of application Ser. No. 81,616, filed Oct. 16, 1970, now U.S. Pat. No. 3,732,332

The present invention relates to a novel process for the mass or bulk polymerization of maleic monomers with alkyl substituted vinyl hydrocarbons, to novel products resulting from such a process and to novel epoxy compositions derived therefrom. One specific aspect of the present invention relates to a bulk polymerization process for preparing novel, low molecular weight polymers of a maleic monomer and vinyl aromatic hydrocarbon, typically co-polymers of maleic anhydride and α-methyl styrene which are particularly useful as hardeners in epoxy compositions.

There is growing interest in low molecular weight polymers of maleic monomers. Heretofore, it has been proposed to employ various techniques of solution, bulk and the like procedures to co-polymerize maleic monomers and vinyl hydrocarbons such as styrene. Of the bulk polymerization techniques it has been proposed to copolymerize styrene and maleic anhydride in a 1:1 molar ratio employing a polymerization catalyst wherein the reagents along with the catalyst are mixed together and then heated to polymerization temperatures giving rise to products of very high viscosity and of very high molecular weights.

By far the most common mode of preparing copolymers of maleic monomers and vinyl hydrocarbon employed in the art today are solvent or solution polymerization processes which are relatively costly since they require removal of the large amounts of solvent required and in general only permit 10 to 50 percent utilization of kettle capacity for the actual product being produced.

While low molecular weight copolymers have been prepared, e.g. copolymers of a molecular weight of less than 10,000 generally within the range of 1500 to 2,000, the molecular weight has been subject to the effect of controlling at least three variables with either or all of them exerting adverse effects. For example, it has been widely held heretofore that either of higher temperatures, larger amounts of catalyst or the selection of particular solvents such as xylene would result in copolymers of molecular weights below 10,000 depending on how these parameters were controlled.

Despite the abundant amount of work done in this area, however, there still exists serious disadvantages which preclude successful preparation of low molecular weight products. The prior procedures have suffered from the disadvantages inherent in the facts that control of the polymerization reaction once initiated has been difficult; copolymers produced generally have a broad molecular weight range and, in general, only high molecular weight, high viscosity products have been produced.

It is highly desirable to have low molecular weight copolymers available to the art. It is particularly desirable that such products be prepared by a low cost bulk polymerization technique which is readily controlled and which, when repeated, gives low molecular weight products in a predictable and narrow range.

Accordingly, it is an object of this invention to provide a novel polymerization process for preparing low molecular weight polyanhydrides derived from maleic anhydride and vinyl hydrocarbons.

It is a further object of this invention to provide a process wherein more consistent and specific properties of the polyanhydrides are obtained.

Still another object is to provide novel, low molecular weight polyanhydrides possessing a higher degree of reactivity, lower softening points and higher molar ranges of maleic monomer.

A further object of the present invention is to provide novel epoxy compositions containing said polyanhydrides which exhibit improved properties.

These and other objects will be apparent from the description of the invention which follows.

POLYANHYDRIDES AND PREPARATION THEREOF

The above and related objects are attained by a novel process in which the maleic monomer is heated, preferably under an inert atmosphere, to a temperature within the range of about 160° to about 200°C. and the vinyl monomer is slowly added thereto, with agitation, at a rate which allows for the necessary control of the heat of reaction, the reaction temperature being maintained within said range until essentially all of the maleic monomer and alkyl styrene have polymerized, said reaction being conducted in the absence of solvent and catalyst to yield a polyanhydride having a molecular weight below about 1,000, generally within the range of about 200 to about 950 and especially about 300 to 450, containing maleic monomer to vinyl monomer in a ratio greater than 1 to 1.

The novel polyanhydrides provided by the instant process possess unusually attractive properties which render them particularly suitable as hardeners in epoxy molding compositions and offer several advantages as hardeners over conventional mono and dianhydrides when employed in such compositions as illustrated further hereinbelow. The novel polyanhydrides have low softening points, e.g. 111°–156°C., and offer better processibility as components of various formulated epoxy compositions suitable for use as epoxy laminating resins, epoxy potting resins, epoxy coating resins and other miscellaneous applications well known to this art. Such epoxy compositions including those containing fillers show rapid cure even with epoxy resins having relatively high epoxy equivalent weight and result in cured products having high heat distortion temperatures (HDT) and excellent electrical and shelf life properties. These improvements are mainly attributed to the higher molar proportion of maleic anhydride which allows for a higher degree of reactivity which in turn gives rise to faster cure, high HDT, etc. in epoxy resin-containing compositions.

The novel process also possesses certain advantages over prior procedures. It is a bulk polymerization allowing virtually 100 percent utilization of kettle capacity as compared to conventional solvent processes which utilize only 10 to 50 percent of kettle capacity for actual product produced. Secondly, elaborate and expensive equipment is not required since any conventional polyester reaction kettle can be employed with satisfactory results. Additionally, vacuum stripping of the product is not required and free vinyl monomer in the product is always of sufficiently low concentration not to interfere with ultimate use requirements. Under optimum conditions, for example, such concentrations of free vinyl monomer will be less than 1 percent.

While it is not known exactly how the polyanhydrides process mechanism functions to product the low molecular weight polyanydrides or why it is successful while other attempts at bulk polymerization have not been in achieving the same goals, it is believed that the key factors are the instantaneous nature of the reaction at the elevated temperatures employed and effective control of the heat of reaction. These factors are obtained by adding the maleic anhydride initially, adding the vinyl monomer at a slow rate and effecting the reaction at an elevated temperature. It is believed that the slow addition of the vinyl monomer keeps the amount of free monomer so low that the heat of reaction is easily dissipated and thereby prevents the normally run-away reaction and allows production of low molecular weight products. Moreover, it is believed that the high temperature at which the reaction is initiated is of critical importance. It is believed that at temperatures lower than 160°C., initiation of the reaction is so slow as to permit a buildup of monomer which, once the reaction is initiated, allows for a run-away, uncontrolled reaction. To the contrary, at temperatures of from about 160° to 200°C., the latter temperature being the reflux temperature of maleic anhydride, reaction is spontaneous and this condition, coupled with the slow addition of vinyl monomer permits control of the heat and rate of reaction.

The process of the invention is generally adaptable to the copolymerization of alkyl substituted styrenes including those containing additional substituents inert to the reaction. In general, such alkyl styrenes are of the formula:

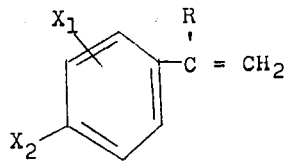

wherein R is hydrogen or alkyl containing 1 to 4 carbon atoms with the proviso that when $X_1$ and $X_2$ are hydrogen, R is alkyl; $X_1$ and $X_2$ are hydrogen, halogen such as chloro, bromo, and iodo; alkoxy, alkyl and haloalkyl wherein the alkyl groups contain from 1 to 4 carbon atoms; acetyl, monocyclic aryl such as phenyl, tolyl, xylyl; aralkyl such as benzyl, phenetyl, etc. or $X_1$ and $X_2$ together with the benzene nucleus may form a fused ring. Such alkyl styrenes include α-methyl styrene, isopropyl styrene, vinyl toluene, tertiary butyl styrene, vinyl xylene, 2,4-dimethyl styrene, 2-methyl-4-chlorostyrene, vinyl naphthalene, 2-methyl-4-benzyl styrene, and mixtures thereof.

It has been found that the conventional polymerization catalysts and molecular weight regulators heretofore believed to be essential to promote free radical initiation are not necessary in the practice of the instant invention. It has been previously believed that the molecular weight of the products would be significantly lowered when using high catalyst concentrations. To the contrary and unexpectedly, in the present invention, such catalysts have little or no effect and offer no advantage. Similarly, molecular weight regulators are not required to produce the low molecular weight products of the invention although they may be employed in certain instances if desired. Such molecular weight regulators include mercaptans, for example, isooctyl mercaptan, octadecyl mercaptan, lauryl mercaptan, etc. nitrostyrene, chlorohydrocarbons for example chlorobenzene, dichlorobenzene, chloroxylene, etc. and other compounds well known in the art for this purpose.

It is a distinction of this invention that the preferred vinyl monomer, α-methyl styrene, appears to function as a molecular weight regulator in the instant reaction. This is illustrated by preparation of extremely low molecular weight polyanhydride copolymers, e.g. 300–450 M.W., when reacting α-methyl styrene and maleic anhydride. The molecular weights of copolymers are slightly higher when employing alkyl styrenes other than α-methyl styrene. For example, tertiary butyl styrene-maleic anhydride copolymer has a M.W. of about 638 while the terpolymer with α-methyl styrene has a molecular weight of about 550. Thus, the preferred polyanhydrides of the invention will be copolymers of α-methyl styrene and maleic anhydride and terpolymers of α-methyl styrene, other alkyl styrenes, for example, tertiary butyl styrene and maleic anhydride. Alternatively, copolymers of alkyl styrenes other than α-methyl styrene but exhibiting the lowest molecular weight may be also be prepared by employing molecular weight regulators such as lauryl mercaptan as illustrated further hereinbelow. Use of the latter molecular weight regulator is not preferred, however, since it imparts an unpleasant odor to the final product. It is a further distinction of this invention that while copolymers, terpolymers, etc. of the alkyl styrenes with maleic compounds may be prepared having low molecular weights, styrene, which is normally the preferred reactant in other procedures, is not operable unless reacted in conjunction with one of the alkyl styrenes of the invention. As will be illustrated further hereinabelow, attempts to produce styrene-maleic anhydride copolymers in the absence of alkyl styrene by the present process resulted in run-away reactions with large amounts of polystyrene forming over the sides of the reactor, the products being extremely viscous and having high molecular weights.

The maleic compounds copolymerized with the above vinyl monomers are, in general, compounds which have one carboxyl group attached to each carbon atom of an olefinic group, i.e., wherein two carbon atoms are joined by a double bond. The remaining valences of each of the double bonded carbon atoms are generally satisfied by organic groupings or inorganic groupings which are essentially inert in the principal copolymerization reaction. Thus, the maleic compound will have only one olefinic linkage. Illustrative of such maleic compounds are materials defined by the following general formula:

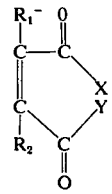

wherein $R_1$ and $R_2$ can be hydrogen, halogen such as chloro, bromo and iodo; aryl such as phenyl, xylyl, tolyl, etc.; aralkyl such as benzyl, phenetyl, etc., or alkyl, the alkyl groups containing 1 to 10 carbon atoms; or cycloalkyl such as cyclopentyl, cyclohexyl, etc.; X and Y can be OH, or X and Y together is O. Typical examples of such compounds include maleic anhydride, methyl maleic anhydride and materials which rearrange thereto during the reaction such as itaconic anhydride; propyl maleic anhydride, 1,2-diethyl maleic anhydride, phenyl maleic anhydride, cyclohexyl maleic anhydride, benzyl maleic anhydride, chloromaleic anhydride, and maleic acid. Maleic anhydride is especially preferred.

The maleic monomer and the vinyl monomer will be employed in molar ratios greater than 1.0 mole maleic monomer to 1.0 mole of vinyl monomer, preferably in the range of 1.1 to 1.0 to 2.0 to 1.0.

The processing techniques of the invention are subject to variation. It has been found that all of the maleic monomer may be added to the kettle and heated to the prescribed temperature or a major portion may be added, the remainder being added after all of the vinyl monomer has been added. In the latter procedure, the final addition of a small amount of maleic monomer aids in keeping the amount of free vinyl monomer in the product to a minimum. It is not desirable to employ reverse addition, e.g. to add vinyl monomer to the kettle followed by slow addition of maleic monomer since such a procedure results in highly viscous copolymers of molecular weights outside the desired range which are not suitable for use in epoxy molding compounds. Since under optimum conditions, there is less than 1.0% unreacted vinyl monomer, the products are recovered by merely pouring into containers. Recovery, where needed, however, may be easily accomplished by vacuum stripping unreacted material by conventional means.

The following examples are set forth to illustrate more clearly the principle and practice of this invention. Where parts or quantities are set forth, they are parts of quantities by weight.

EXAMPLES 1 to 7

1960 parts (20 moles) of maleic anhydride were charged to a polymerization kettle after the kettle was flushed free of air with nitrogen. The charge of maleic anhydrides was heated to 180°C. with stirring after which 1770 parts (15 moles) of alpha-methyl styrene were added over a 3½ hour period. After said addition was complete, the temperature was raised to 200°C. over 30 minutes. 250 parts (2.53 moles) of additional maleic anhydride was added to the reaction zone and heated to 200° to 210°C. for 1 hour after which the liquid was dropped into containers. There were recovered a solid polymer having a Ring and Ball softening point of 111°C., a Gardner-Holdt viscosity of U-V (40% resin in tetrachloroethane), a molecular weight of 350 and anhydride equivalent weight of 177.

The procedure of Example 1 was repeated except the reactants and conditions were varied as indicated with the results reported in Examples 1 to 7 in Table I which follows. In Example 2, the procedure was the same except that all of the maleic anhydride was added initially.

EXAMPLES 8 to 10

For purposes of comparison, several experiments were run and are reported in Table I also.

In comparative Example 8, the procedure of Example 1 is repeated except that styrene is substituted resulting in an uncontrollable reaction with high formation of polystyrenes.

In comparative Example 9, a 1:1 styrene-maleic anhydride copolymer is prepared by solvent process as follows:
Part A — 2400 grams xylene
Part B — 2.4 moles maleic anhydride
   2.4 moles styrene
   1½% tertiary butyl perbenzoate catalyst
   320 grams xylene Part A is charged to the kettle and heated to 95°–100°C. Part B is dissolved together and added to the reaction vessel over a 2 hour period after which it is maintained in the vessel for 2 hours at 95°–100°C., cooled to 30°C. and filtered. The product starts to precipitate after 30 minutes and is recovered as a finely divided precipitate. The product could not be melted for softening point determination as it blackened or carbonized as the temperature increased. The softening point was thereby indicated to be well above 200°C.

In comparative Example 10, a commercially available 1:1 styrene-maleic copolymer, commercially available as SMA 1000-A, Arco Chemical Company, is listed and employed in subsequent experiments hereinbelow.

In Table I, abbreviations where they appear have the following meanings: αMS is alpha methyl styrene; S is styrene; VT is vinyl toluene; TBS is tertiary butyl styrene; TCE is tetrachloroethane; DMF is dimethyl formamide; and TBPB is tertiary butyl perbenzoate catalyst.

Table I

| Example | 1 | 2 | 3 | 4 | 5 |
|---|---|---|---|---|---|
| Maleic Anhydride (Moles) | | | | | |
| A | 20 | 12 | 9.0 | 8 | 9.0 |
| B | 2.53 | — | 0.6 | 1 | 0.6 |
| Vinyl Monomer | αMS | αMS | VT | S-6.0 | TBS |
| (Moles) | 15.0 | 6 | 7.2 | αMS-2.0 | 7.2 |
| Ratio of Reactants Vinyl Monomer/Maleic Monomer | 1.0/1.5 | 1/2 | 1.0/1.33 | 1.0/1.125 | 1.0/1.33 |
| Solvent | — | — | — | — | — |
| Other Reactant | — | — | 46.5g.Lauryl Mercaptan | — | — |
| Catalyst | — | — | — | — | — |
| Addition Time, Hours | 3½ | 2 | 3½ | 3¾ | 3½ |
| Reaction Temperature, °C. | 180° | 180° | 180° | 180° | 180° |
| Gardner-Holdt Viscosity | U-V | U | M | W | Y |
| | 40% resin TCE | 40% resin TCE | 30% resin TCE | 60% resin DMF | 30% resin TCE |
| Molecular Weight | 350 | 355 | 432 | 485 | 638 |
| Anhydride Equivalent Weight | 177 | 158 | 191 | 187 | 214 |
| Softening Point, °C. | 111° | 123° | 122° | 140° | 156° |
| Remarks | | | | | |

Table I-continued

| Example | 1 | 2 | 3 | 4 | 5 |
| --- | --- | --- | --- | --- | --- |
| Example | 6 | 7 | 8 | 9 | 10 |
| Maleic Anhydride (Moles) A | 8 | 8 | 6.0 | 2.4 | — |
| B | 1 | 1 | 0.4 | — | — |
| Vinyl Monomer (Moles) | VT-6.0 αMS-2.0 | TBS-6.0 αMS-2.0 | S 4.8 | S 2.4 | S |
| Ratio of Reactants Vinyl Monomer/Maleic Monomer | 1.0/1.125 | 1.0/1.125 | 1.0/1.3 | 1.0/1.0 | 1/1 |
| Solvent | — | — | — | Xylene | — |
| Other Reactant | — | — | — | — | — |
| Catalyst | — | — | — | 1.5% TBPB | — |
| Addition Time, Hours | 4 | 4½ | 3½ | 2 | — |
| Reaction Temperature, °C. | 180° | 185° | 180° | 95–100° | — |
| Gardner-Holdt Viscosity | X–Y 60% resin DMF | Y 40% resin TCE | — | — | — |
| Molecular Weight | 556 | 555 | — | — | 1600 |
| Anhydride Equivalent Weight | 202 | 232 | — | — | 225 |
| Softening Point, °C. | 145° | 132° | — | >200° Would not melt for softening point; carbonized before softening. | >200° |
| Remarks | | | Reaction stopped after ¾ of Styrene added. Large amounts of Polystyrenes over sides & top of reactor. | | Commercially available- SMA - 1000A |

POLYANHYDRIDE PREPOLYMER

In a preferred embodiment of this invention, low melting, economical epoxy-hardener prepolymers are provided which have extremely low Ring and Ball softening points and provide greater ease of processing with additional epoxy resin and other components of epoxy composition. For example, in the preparation of epoxy molding compounds, to optimize blending of the hardener with the resin of the molding compound when the polyanhydrides per se are employed, the polyanhydrides are first ball milled to a fine powder prior to blending and processing. This step is not necessary when employing the polyanhydride prepolymer. Additionally, this embodiment of the invention permits ready use of liquid epoxy resins of low epoxy equivalent weight and high reactivity.

The preparation of the prepolymer is simple in that the epoxy resin is simply added to the polyanhydride hardener product while it is still in the reaction kettle. The prepolymers are characterized by good stability and range from viscous liquids to materials which exhibit Ring and Ball softening points below 100°C., generally within the range of about 40° to 95°C.

A variety of low equivalent weight epoxy resins can be reacted with the polyanhydrides to form the prepolymer herein. They include glycidyl polyethers of polyhydric alcohols and polyhydric phenols well known in the art, for example, diglycidyl ethers of Bisphenol A commercially available as Epon resins. Other suitable resins include polyglycidyl ethers of phenol-formaldehyde novolacs and cresol-formaldehyde novolacs, cycloaliphatic epoxy resins, etc. In general, suitable epoxy resins will be characterized as having an epoxy equivalent weight within the range of about 75 to about 500.

The prepolymers are prepared by adding from about 0.1 to about 1.3 equivalents of epoxy per anhydride equivalent weight.

This aspect of the invention will be better understood from the example which follows:

EXAMPLE 11

Following the procedure of Example 2 and employing the reactants thereof, the reaction is allowed to cool to 155°C. A commercially available diglycidyl ether of Bisphenol A, having a molecular weight of 380–400 (at 45° to 50°C.) equal to 54 percent of the charge in the kettle is added over 5 to 10 minutes with stirring. The temperature drops to about 115°C. and is held there for 30 minutes after which the product is dropped into containers. The product is a prepolymer containing 65% polyanhydride/35% epoxy, has a Ring and Ball Softening point of 81° to 85°C. and a Gardner Holdt viscosity (40% resin in tetrachloroethane) of D-G.

When the polyanhydride of Example 1 is substituted in the above experiment, a prepolymer is received of comparable viscosity and having a softening point within the range of 69° to 76°C.

EPOXY MOLDING COMPOUNDS

Epoxy molding compounds employing the polyanhydrides or prepolymers of this invention have improved physical and molding properties especially in high temperature dry and wet electrical properties of the molded pieces, in shelf life of the molding compounds and in release during molding.

Suitable epoxy molding compounds may be prepared by conventional techniques, for example, by dry blending the components in a suitable mixer followed by suitable processing, for example, fusion on a heated two roll mill. Process temperatures will vary according to the resin and hardener types employed but are generally within the range of about 75° to 250°F. The fused product is then cooled and granulated in a suitable grinder such as a Fitzpatrick mill.

The resulting molding compounds can be molded using conventional procedures and equipment familiar to those skilled in the art. It will be understood that the temperature employed and the length of cure will vary depending on the particular resin system employed. In general temperatures ranging from about 140° to about 200°C. will be sufficient.

The epoxy resin component of the molding compound are those containing more than one

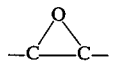

group. The polyepoxides may be saturated or unsaturated, aliphatic, cycloaliphatic, heterocyclic, aromatic and may be substituted if desired with substituents such as chlorine, hydroxyl, ether radicals and the like.

Various examples of polyepoxides that may be used in the process of the invention are given in U.S. Pat. No. 2,633,458 and it is to be understood that so much of the disclosure of the patent relative to examples of polyepoxides is incorporated by reference into this specification.

Other examples include the epoxidized esters of the polyethylenically unsaturated monocarboxylic acids such as epoxidized linseed, soybean, perilla, oiticia, tung, walnut and dehydrated castor oil, methyl linoleate, butyl linoleate, ethyl 9,12-octadecadienoate, butyl 9,12,15-octadecatrienoate, butyl eleostearate, monoglycerides of tung oil fatty acids, monoglycerides of soybean oil, sunflower, rapeseed, hempseed, sardine, cottonseed oil, and the like.

Another group of the epoxy-containing materials used in the process of the invention include the epoxidized esters of unsaturated monohydric alcohols and polycarboxylic acids, such as, for example, di(2,3-epoxybutyl) adipate, di(2,3-epoxybutyl) oxalate, di(2,3-epoxyhexyl) succinate, di(3,4-epoxybutyl) maleate, di(2,3-epoxyoctyl) pimelate, di(2,3-epoxybutyl) phthalate, di(2,3-epoxyoctyl) tetrahydrophthalate, di(4,5-epoxydodecyl) maleate, di(2,3-epoxybutyl) terephthalate, di(2,3-epoxypentyl) thiodipropionate, di(5,6-epoxytetradecyl) diphenyldicarboxylate, di(3,4-epoxyheptyl) sulfonyldibutyrate, tri(2,3-epoxybutyl) 1,2,4-butanetricarboxylate, di(5,6-epoxypentadecyl) tartarate, di(4,5-epoxytetradecyl) maleate, di(2,3-epoxybutyl) azelate, di(3,4-epoxybutyl) citrate, di(5,6-epoxyoctyl) cyclohexane-1,2-dicarboxylate, di(4,5-epoxyoctadecyl) malonate.

Another group of the epoxy-containing materials includes those epoxidized esters of unsaturated alcohols and unsaturated carboxylic acids, such as 2,3-epoxybutyl 3,4 -epoxypentanoate, 3,4-epoxyhexyl 3,4-epoxypentanoate, 3,4-epoxycyclohexyl, 4,5-epoxyoctanoate, 2,3-epoxycyclohexylmethyl epoxycyclohexane carboxylate.

Still another group of the epoxy-containing materials included epoxidized derivatives of polyethylenically unsaturated polycarboxylic acids such as, for example, dimethyl 8,9,12,13-diepoxyeicosanedioate, dibutyl 7,8,11,12-diepoxyoctadecanedioate, dioctyl 10,11-diethyl-8,9,12,13-diepoxy-eiconsanedioate, dihexyl 6,7,10,11-diepoxyhexadecanedioate, didecyl 9-epoxyethyl-10,11-epoxyoctadecanedioate, dibutyl 3-butyl-3,4,5,6-diepoxycyclohexane-1,2-dicarboxylate, dicyclohexyl 3,4,5,6-diepoxycyclohexane-1,2-dicarboxylate, dibenzyl 1,2,4,5-diepoxycyclohexane-1,2-dicarboxylate and diethyl 5,6,10,11-diepoxyoctadecyl succinate.

Still another group comprises the epoxidized polyesters obtained by reacting an unsaturated polyhydric alcohol and/or unsaturated polycarboxylic acid or anhydride groups, such as, for example, the polyester obtained by reacting 8,9,12,13-eicosanedienedioic acid with ethylene glycol, the polyester obtained by reacting diethylene glycol with 2-cyclohexene-1,4- dicarboxylic acid and the like, and mixtures thereof.

Still another group comprises the epoxidized polyethylenically unsaturated hydrocarbons, such as epoxidized 2,2-bis(2-cyclohexenyl) propane, epoxidized vinyl cyclohexene and epoxidized dimer of cyclopentadiene.

Another group comprises the epoxidized polymers and copolymers of diolefins, such as butadiene. Examples of this include, among other, butadiene-acrylonitrile copolymers (HYcar rubbers), butadiene-styrene copolymers and the like.

Another group comprises the glycidyl containing nitrogen compounds, such as diglycidyl aniline and di- and triglycidylamine.

The polyepoxides that are particularly preferred for use in the compositions of the invention are the glycidyl ethers and particularly the glycidyl ethers of polyhydric phenols and polyhydric alcohols. The glycidyl ethers of polyhydric phenols are obtained by reacting epichlorohydrin with the desired polyhydric phenols in the presence of alkali.

Polyether A and Polyether B described in the above-noted U.S. Pat. No. 2,633,458 are good examples of polyepoxides of this type. Other examples include the polyglycidyl ether of 1,1,2,2-tetrakis(4-hydroxyphenol)ethane (epoxy value of 0.45 eq./100 g. and melting point 85°C.), polyglycidyl ether of 1,1,5,5-tetradis(hydroxyphenol)pentane (epoxy value of 0.514 eq./100 g.) and the like and mixtures thereof. Other examples include the glycidated novolacs obtained by reacting epichlorohydrin with novolac resins obtained by condensation of aldehydes with polyhydric phenols.

The polyepoxide and polyanhydride hardeners are employed in proportions to provide at least 0.5 equivalent of anhydride. Generally, the proportions will range from 0.5 to 2.0 anhydride group per epoxy group and preferably from about 0.7 to 1.1.

Various catalysts may be employed to promote the curing of said compositions and are well known within this art. Such catalysts include basic and acidic catalysts such as the metal halide Lewis acids, e.g. boron trifluoride, stannic chloride, zinc chloride and the like; the amines, e.g. alphamethyl benzyl-dimethylamine, dimethylethylamine, dimethylaminoehtylphenol, 2,4,6-tris(dimethylaminoethyl)phenol, triethylamine and the like. Such compounds are employed in the amounts conventional in the art, e.g. from about 0.1 to 5.0 percent by weight of the binder system.

Various other ingredients may be mixed with the polyepoxide composition including pigments, dyes, mold lubricants and the like.

Fillers may be employed in the instant polyepoxide compositions in varying amounts to convey special properties thereto where desired. Such fillers suitable for use include among others, silica, mica, calcium carbonate, fiberglass, talc, asbestos, alumina, zinc oxide, cellulose and mixtures thereof. The amount of filler added to the polyepoxide composition may vary over a wide range. In general, amounts ranging from about 500 to 50 parts by weight per 100 parts by weight of polyepoxide component are preferred.

The following examples are given to illustrate epoxy molding compounds of this invention.

EXAMPLES 12 to 20

Epoxy molding compounds are prepared employing 22.9 parts by weight of diglycidyl ether of bisphenol A, having an equivalent weight of 488, 7.1 parts by weight polyanhydride hardener, 0.2 parts by weight tris(dimethylaminomethyl)phenol as catalyst, 0.2 parts by weight mold lubricant, and 67.8 parts by weight silica filler. The ingredients were dry blended followed by roll milling at 140°–150°F. after which the fused product was cooled and granulated in a Fitzpatrick mill. The resulting molding compounds were evaluated for flow properties and shelf life and were then transfer molded at 300°F. for five minutes, postcured for 2 hours at 135°C. Molded specimens were tested for mechanical and electrical properties.

The results are reported in Table II which follows in which the same procedure was employed in each example except that various hardeners were substituted, as indicated. In all instances, the proportions of epoxy resin plus hardener equaled 30 weight percent of the composition and the A/E ratio was maintained at 0.85.

involves the transfer molding of the material from a pot through a sprue into an open ended spiral cavity under controlled conditions of temperature and pressure. The Gel Time reported in Table II was determined by the use of a ram follower device in conjunction with the EMMI Spiral Flow mold.

The first observation readily apparent from the table is that both compounds based on solvent polymerized styrene maleic anhydride at a 1:1 ratio did not cure and had little or no flow even at 350°F., a fact probably attributable to the high softening points of these compounds which prevent adequate fusion of the hardener with the resin which is required for adequate cure and flow. All of the products of the present invention possess good flow, cure and hardness properties and very good shelf life, an advantage over many existing epoxy molding compounds.

The epoxy molding compounds of the above examples were similarly evaluated for other properties such as heat distortion temperatures (HDT), flexural strength and electricals, the results of which are reported in Table III. Moisture absorption data after 16 hours at 15 psig. steam was determined and reported below. Dielectric constants (DK) and dissipation factors (DF) were determined on these materials at 25°C., 175°C., and at 25°C. after exposing the test piece for 16 hours in a pressure cooker at 15 psig steam.

Table II is an evaluation of flow, cure, and shelf life properties of the instant molding compositions. EMMI flow via EMMI Spiral Flow Specification EMMI I-66

Table II

| Ex. | Hardener % | Hardener Type and Example No. | Maleic/Vinyl Ratio | EMMI Flow and Gel, 300°F. 7 days | | Initial EMMI Flow & Gel Time at 350°F. 17 days | | Retention of Flow at 100°F. (Shelf Life) | | | | Hot Shore "D" Hardness after cure at 325°F. | | | |
|---|---|---|---|---|---|---|---|---|---|---|---|---|---|---|---|
| | | | | In. | Sec. | In. | Sec. | In. | % | In. | % | 2 min. | 3 min. | 4 min. | 5 min. |
| 12 | 7.1 | αMS/MA of Ex. 1 | 1.5 | 27.5 | 43 | 37 | 16 | 29 | 78 | 30 | 81 | 60 | 72 | 73 | 75 |
| 13 | 7.5 | VT/MA of Ex. 3 | 1.33 | 17.5 | 41 | 27 | 13 | 20 | 74 | 20 | 74 | 72 | 72 | 74 | 75 |
| 14 | 8.1 | TBS/MA of Ex. 5 | 1.33 | 7.0 | 36 | 11 | 7 | 10.5 | 96 | 10.5 | 96 | 70 | 74 | 77 | 77 |
| 15 | 7.9 | VT/αMS/MA of Ex. 6 | 1.125 | 11 | 16 | 14 | 15 | 12.5 | 89 | 10.5 | 75 | 76 | 77 | 77 | 77 |
| 16 | 8.6 | TBS/αMS MA of Ex. 7 | 1.125 | 14 | 33 | 16 | 13 | 14 | 88 | 13 | 81 | 70 | 76 | 79 | 79 |
| 17 | 6.4 | αMS/MA of Ex. 2 | 2.0 | 20 | 36 | 27.5 | 13 | 26 | 95 | 22.5 | 82 | 77 | 80 | 80 | 80 |
| 18 | 7.4 | S/αMS/MA of Ex. 4 | 1.125 | 14.5 | 21 | 20 | 10 | 16.5 | 83 | 15 | 75 | 70 | 73 | 73 | 77 |
| 19 | 8.0 | S/MA of Ex. 9 | 1.0 | No Flow, No Cure | | 5 | No Cure | | | | | | | | |
| 20 | 8.5 | S/MA of Ex. 10 | 1.0 | No Flow, No Cure | | No Flow, No Cure | | | | | | | | | |

Table III

| Ex. | Hardner Type | HDT, °C. After cure at 325°F. for 5 min. Post-cure 2 hrs. at 175°C. | Flexural Strength psi | Flexural Modulus psi × 10⁶ | % Water Absorption 16 hr., 15 psig Steam | Electricals | | | |
|---|---|---|---|---|---|---|---|---|---|
| | | | | | | DK 60 cycles (a) 25°C. (b) 175°C. (c) 25°C.* | DK 1 KC (a) 25°C. (b) 175°C. (c) 25°C.* | DF 60 cycles (a) 25°C. (b) 175°C. (c) 25°C.* | DF 1 KC (a) 25°C. (b) 175°C. (c) 25°C. |
| 12A | αMS/MA of Ex. 1 | 153°C. | 16,037 | 1.78 | .74 | (a) 4.19 (b) 5.21 (c) — | (a) 3.99 (b) 4.94 (c) 7.25 | (a) .0094 (b) .0390 (c) — | (a) .0089 (b) .0252 (c) .390 |
| 13A | VT/MA of Ex. 3 | 145°C. | 17,646 | 1.83 | .84 | (a) 4.13 (b) 5.18 (c) 7.26 | (a) 3.97 (b) 4.89 (c) 5.53 | (a) .0085 (b) .0390 (c) .300 | (a) .0075 (b) .0262 (c) .124 |
| 14A | TBS/MA of Ex. 5 | 148°C. | 14,246 | 1.73 | .81 | (a) 4.16 (b) 5.13 (c)11.54 | (a) 4.08 (b) 4.86 (c) 6.23 | (a) .0089 (b) .0398 (c) .742 | (a) .0076 (b) .0239 (c) .254 |
| 15A | VT/αMS/- | 165°C. | 16,269 | 1.87 | .94 | (a) 4.19 | (a) 4.11 | (a) .0086 | (a) .0086 |

Table III-continued

| Ex. | Hardner Type | HDT, °C. After cure at 325°F. for 5 min. Post-cure 2 hrs. at 175°C. | Flexural Strength psi | Flexural Modulus psi × 10⁶ | % Water Absorption 16 hr., 15 psig Steam | Electricals | | | |
|---|---|---|---|---|---|---|---|---|---|
| | | | | | | DK 60 cycles (a) 25°C. (b) 175°C. (c) 25°C.* | DK 1 KC (a) 25°C. (b) 175°C. (c) 25°C.* | DF 60 cycles (a) 25°C. (b) 175°C. (c) 25°C.* | DF 1 KC (a) 25°C. (b) 175°C. (c) 25°C. |
| | MA of Ex. 6 | | | | | (b) 5.27 (c) 6.13 | (b) 5.03 (c) 5.29 | (b) .0427 (c) .154 | (b) .0271 (c) .0693 |
| 16A | TBS/αMS/-MA of Ex. 7 | 167°C. | 15,012 | 2.02 | .76 | (a) 4.11 (b) 5.06 (c) 8.07 | (a) 4.05 (b) 4.80 (c) 5.50 | (a) .0086 (b) .0354 (c) .421 | (a) .0076 (b) .0224 (c) .149 |
| 17A | αMS/MA of Ex. 2 | 184°C. | 14,360 | 1.75 | .73 | (a) 4.23 (b) 5.01 (c) — | (a) 4.17 (b) 4.82 (c) 8.49 | (a) .0069 (b) .0291 (c) — | (a) .0061 (b) .0160 (c) .510 |
| 18A | S/αMS/MA of Ex. 4 | 141°C. | 12,905 | 1.85 | .96 | (a) 4.22 (b) 5.37 (c) 7.00 | (a) 4.16 (b) 5.09 (c) 5.70 | (a) .0085 (b) .0412 (c) .202 | (a) .0078 (b) .0264 (c) .0980 |

*After exposure to 15 psig steam for 16 hrs.

EXAMPLE 21

Epoxy molding compounds are prepared employing 8.0 parts by weight of epoxy resin, a diglycidyl ether of Bis-phenol A having a molecular weight of 460–560, to which was added 13.0 parts by weight of prepolymer hardener described in Example 11, 0.14 parts by weight of tertiary amine catalyst, 0.50 parts by weight mold lubricant and 78.3 parts by weight silica filler.

The epoxy molding compound was evaluated for a number of molded properties the results of which are reported below.

| | |
|---|---|
| Heat Distortion Temperature, °C. | 220 |
| Flexural Strength, psi | 20,000 |
| Electrical Properties, Dry Dissipation Factor at | |
| 60 cycles, 25°C. | .007 |
| 60 cycles, 175°C. | .045 |
| Electrical Properties, Wet (after 15 psig steam for 16 hours) | |
| Weight Gain, % | 0.60 |
| Dissipation Factor at 60 cycles | .025 |

For comparative purposes, the instant molding compounds were compared with various monoanhydride and dianhydride cured epoxy molding compounds and with several commercially available anhydride epoxy compounds and the results reported in Table IV.

The formulation was as follows with variations as indicated in the Table.

| | Wt. Percent |
|---|---|
| Epoxy Resin (diglycidylether of Bis Phenol A) Molecular Weight 1000 | 18.4 |
| Hardener | 9.6 |
| Tertiary Amine Accelerator | 0.15 |
| Lubricants | 0.6 |
| Filler | 70.0 |
| Dye | 0.95 |

The compounds were processed and cured as in Example 12. In the Table, the abbreviations, have the following meanings: DF is dissipation factor; BROB means the value was so high it could not be measured by the test employed; Commercial Epoxy Molding Compounds A, B and C are commercially available epoxy systems containing diglycidyl ethers of bisphenol A as resin, silica fillers and monofunctional anhydride hardeners.

Table IV

| Ex. | Hardener or Epoxy System | A/E Ratio | HDT, °C. | Electricals, Dry DF, 60 cycles | | Electricals, Wet 15 psig steam 16 hours | | Shelf Life, 100°F. EMMI Flow | | |
|---|---|---|---|---|---|---|---|---|---|---|
| | | | | 25°C. | 175°C. | Wt. Gain | DF | Initial | 3 days | 7 days |
| 22 | αMS/MA | .77 | 135° | .0065 | .100 | .80 | .050 | 30 | 25 | 22 |
| 23 | Trimellitic Anhydride | 1.0 | 121° | .017 | .698 | .90 | BROB | 31 | 11 | — |
| 24 | Phthalic Anhydride | 1.0 | 108° | .007 | BROB | 1.27 | BROB | 32 | 11 | — |
| 25 | Tetrahydro-phthalic Anhydride | .90 | 97° | .009 | BROB | 1.42 | BROB | 51 | 21 | — |
| 26 | Hexahydro-phthalic Anhydride | .90 | 97° | .008 | BROB | 1.13 | BROB | 50 | 26 | — |
| 27 | Succinic Anhydride | 1.0 | 96° | .009 | BROB | 2.90 | BROB | — | — | — |
| 28 | Benzo-phenone Tetra-Carboxylic Dianhydride | 1.0 | 172° | .007 | — | 1.70 | BROB | 26 | 13 | — |
| 29 | Commercial Epoxy Molding Compound A | — | 128° | .007 | BROB | — | BROB | 39 | 24 | 18 |
| 30 | Commercial Epoxy Molding Compound B | — | 97° | .007 | — | — | BROB | 29 | 15 | 11 |

Table IV-continued

| Ex. | Hardener or Epoxy System | A/E Ratio | HDT, °C. | Electricals, Dry DF, 60 cycles | | Electricals, Wet 15 psig steam 16 hours | | Shelf Life, 100°F. EMMI Flow | | |
|---|---|---|---|---|---|---|---|---|---|---|
| | | | | 25°C. | 175°C. | Wt. Gain | DF | Initial | 3 days | 7 days |
| 31 | Commercial Epoxy Molding Compound C | — | 112° | .007 | — | — | .539 | 35 | 23 | 22 |

It will be obvious from Table IV, that the molding compounds of the invention are superior in all physical properties tested to those derived from conventional monoanhydrides. Comparison to a commercial dianhydride hardener molding compound (Example 28) shows that compounds based on the novel anhydride hardeners are far superior in a number of the important properties such as shelf life and high temperature and wet electricals. The compounds based on the novel anhydride hardener also exhibited superior mold release after exposure to humid aging conditions.

EXAMPLES 32 to 36

The following examples are given to illustrate molding compounds derived from other types of epoxy resins prepared by the procedure of Example 12. In the Table, TBS-αMS-MA is a polyanhydride of tertiarybutyl styrene-alpha-methyl styrene and maleic anhydride described in Example 7; DGEBA epoxy resins are commercially available resins of the diglycidyl ether of Bisphenol A Type; Novolac Epoxy Resin is a polyglycidyl ether of o-cresol formaldehyde novolac; and Cycloaliphatic Epoxy Resins are low viscosity cycloaliphatic resins, 3,4-epoxycyclohexylmethyl-3,4-epoxycyclohexane carboxylates.

Table V

| Formulation | Ex. 33 | Ex. 34 | Ex. 35 | Ex. 36 | Ex. 37 |
|---|---|---|---|---|---|
| DCEBA Epoxy M.W. 700 | 16.5 | — | — | — | — |
| DGEBA Epoxy M.W. 1000 | — | 12.5 | — | — | — |
| Novolac Epoxy M.W. 1100 | — | — | 20 | — | — |
| Cycloaliphatic Epoxy M.W. 426 | — | — | — | 12.5 | — |
| Cycloaliphatic Epoxy M.W. 280 | — | — | — | — | 11.0 |
| TBS-αMS-MA | 8.5 | 8.5 | 14 | 12.5 | 14.0 |
| Carbon Black | 1.0 | 1.0 | 1.0 | 0.3 | 0.3 |
| Tertiary Amine Catalyst | .13 | .13 | .12 | .13 | .13 |
| Lubricant | .6 | .6 | .6 | .6 | .6 |
| Silica | 71.4 | 59.0 | 55.0 | 64.6 | 64.6 |
| Coupling Agent | .2 | .2 | .2 | — | — |
| Fiberglass | — | 7.5 | 7.5 | 7.0 | 7.0 |
| ZnO | 1.4 | 1.4 | 1.4 | — | — |
| EMMI Flow Inches | 40 | 30 | 30 | 31 | 24 |
| 330°F., Gel Sec. | 22 | 22 | 24 | 18 | 18 |
| Shelf Life, 100°F. | | | | | |
| Initial | 40 | 30 | 30 | 31 | 24 |
| 3 days | 39 | 25 | 24 | 13 | 10 |
| 7 days | 28 | 22 | 22 | — | — |
| 14 days | 31 | — | — | — | — |
| HDT, °C. | 150° | 135° | 210° | 200° | 220° |
| Dissipation Factor, 60 cycles | | | | | |
| 25°C. | .013 | .013 | .013 | .017 | .016 |
| 175°C. | .060 | .082 | .042 | .082 | .065 |
| After Pressure Pot (16 hrs., 15 psig steam) Tested at 25°C. | .050 | .050 | .040 | .353 | .161 |
| Dielectric Constant, 60 cycles | | | | | |
| 25°C. | 4.20 | 4.36 | 4.18 | 4.06 | 4.06 |
| 175°C. | 5.20 | 5.39 | 4.81 | 4.97 | 4.85 |
| After Pressure Pot (16 hrs., 15 psig steam) Tested at 25°C. | 5.22 | 5.30 | 4.78 | 7.61 | 5.55 |

While the above epoxy systems have been described as particularly suitable for use as molding compounds and this use is a preferred embodiment herein, it will be obvious to those skilled in the art that they are equally suitable for other uses, for example, in fusion coating and solvent system coating laminating applications; fluid bed and electrostatic coating applications, etc. They are further useful in such applications as bonding of thermal insulation wherein thermal stability affords an excellent property.

The polyanhydrides can likewise be employed as coreactants with other anhydrides, as flow promoters and elevated temperature modifiers for thermoplastics, etc.

We claim:

1. A low molecular weight polyanhydride having a softening point within the range of about 111° to 156°C, said polyanhydride being the reaction product of the mass polymerization process, in the absence of a polymerization catalyst, of a maleic monomer selected from the group consisting of maleic acid, maleic anhydride, anhydrides which rearrange to maleic anhydrides and the halo-, aryl-, aralkyl-, alkyl-, or cycloalkyl-substituted derivatives thereof and at least one alkyl-substituted styrene in molar proportions of said maleic monomer relative to said alkyl-substituted styrene of greater than 1:1, said polymerization process being effected by heating at least a major portion of the maleic monomer to a temperature of about 160° to about 200°C, adding the alkyl-substituted styrene to said maleic monomer, with agitation, at a rate which permits control of the heat of reaction and continuing the polymerization until essentially all of said maleic monomer and alkyl-substituted styrene have polymerized.

2. The polyanhydride of claim 1 wherein the alkyl-substituted styrene is a member selected from the group consisting of alpha-methyl styrene, vinyl toluene, tertiary butyl styrene and mixtures thereof.

3. The polyanhydride of claim 1 wherein said maleic monomer is maleic anhydride.

4. The polyanhydride of claim 1 wherein said maleic monomer is maleic anhydride and said alkyl-substituted styrene is alpha-methyl styrene.

5. The polyanhydride of claim 1 wherein said maleic monomer is maleic anhydride and said alkyl-substituted styrene is tertiary butyl styrene.

6. The polyanhydride of claim 1 wherein said maleic monomer is maleic anhydride and said alkyl-substituted styrene is a mixture of alpha-methyl styrene and tertiary butyl styrene.

7. The polyanhydride of claim 1 wherein the maleic monomer and the alkyl-substituted styrene monomer are employed in a molar ratio of about 1.1 to 2 molar portions of maleic monomer per molar portion of alkyl-substituted styrene.

8. The polyanhydride of claim 4 wherein said monomers are employed in a molar ratio of about 1.5 to 2 molar portions of maleic anhydride per molar portion of alpha-methyl styrene.

9. The polyanhydride of claim 8, characterized by having a softening point within the range of about 111° to about 123°C.

10. The polyanhydride of claim 9 additionally characterized by having a Gardner-Holdt viscosity at 25°C, as a 40%, by weight, solution in tetrachloroethane, not greater than about V.

11. The polyanhydride of claim 7 wherein said polymerization process is effected under an inert atmosphere.

12. The polyanhydride of claim 11 wherein, following the addition of the alkyl-substituted styrene in said polymerization process, a small amount of the maleic monomer is added prior to continuing with the polymerization.

13. The polyanhydride of claim 12 wherein said polyanhydride is recovered from said polymerization process by vacuum stripping unreacted monomer material.

14. The polyanhydride of claim 7 wherein said polymerization process is effected in the further absence of a molecular weight regulator.

15. The polyanhydride of claim 10 wherein said polymerization process is effected under an inert atmosphere.

16. The polyanhydride of claim 15 wherein, following the addition of the alkyl-substituted styrene in said polymerization process, a small amount of the maleic monomer is added prior to continuing with the polymerization.

17. The polyanhydride of claim 16 wherein said polyanhydride is recovered from said polymerization process by vacuum stripping unreacted monomer material.

18. The polyanhydride of claim 10 wherein said polymerization process is effected in the further absence of a molecular weight regulator.

* * * * *